May 21, 1940.    S. B. YOUNG    2,201,659
APPARATUS FOR MEASURING POTENTIALS
Filed April 6, 1938
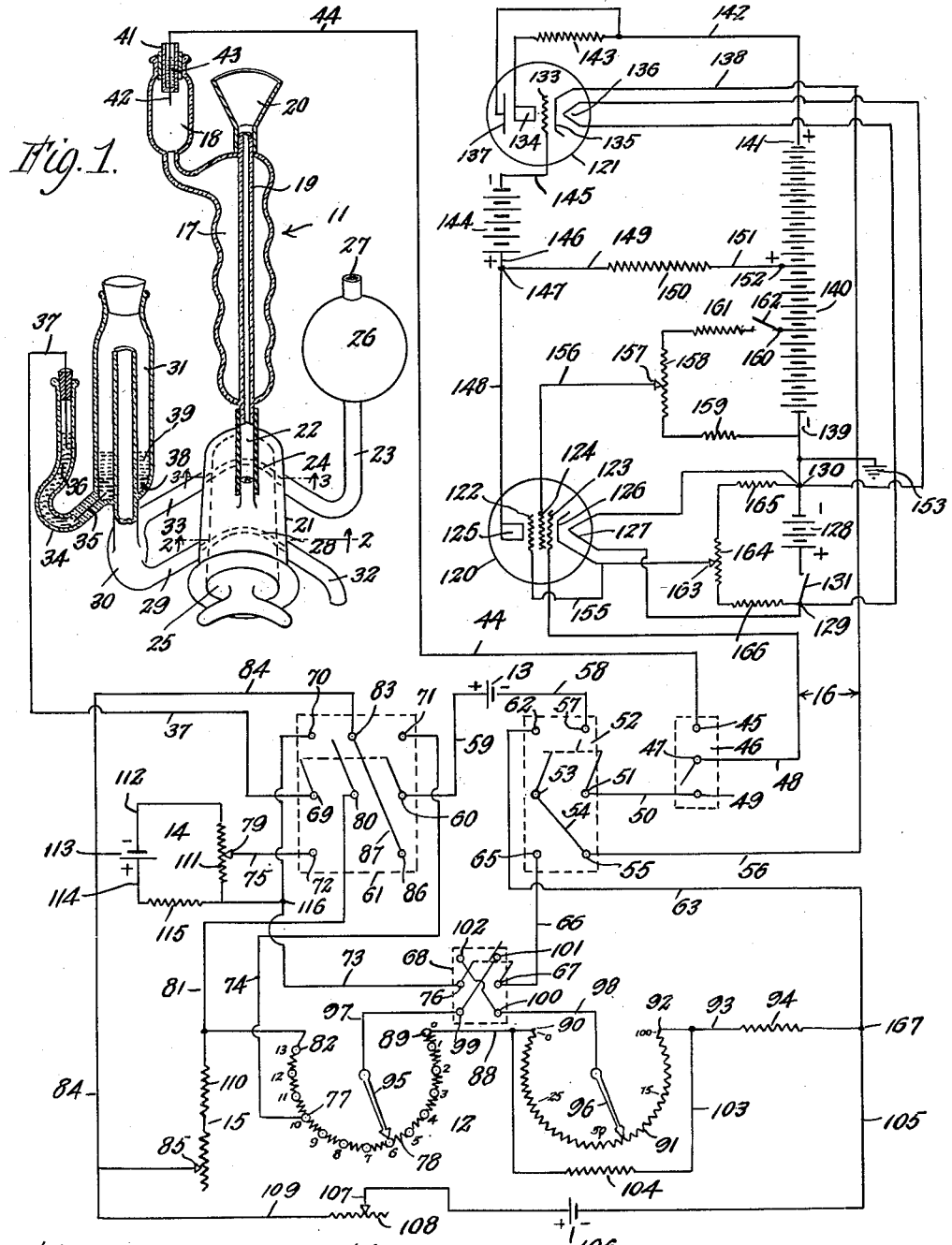
INVENTOR.
Saul B. Young
BY
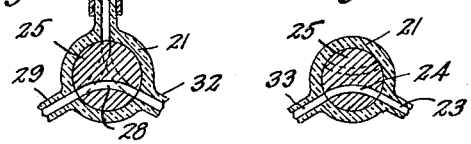
ATTORNEYS Patented May 21, 1940

2,201,659

UNITED STATES PATENT OFFICE 2,201,659

APPARATUS FOR MEASURING POTENTIALS

Saul B. Young, Bronx, N. Y.

Application April 6, 1938, Serial No. 200,309

4 Claims. (Cl. 175—183)

This invention relates to electrical measuring apparatus and while not limited thereto has particular reference to an improved apparatus for measuring minute potentials in circuits which include a solution.

The invention has particular application to the measurement of hydrogen-ion concentration of solutions in terms of pH units.

The invention comprehends in an apparatus of the character described, means for compensating for or balancing out of juncture potentials in the circuit, together with means for adjusting the resistance of the circuit to correspond with the temperature of the solution under test and means for balancing the potential across a high resistance medium permeable to hydrogen-ions and which medium surrounds the solution to be tested.

The invention more particularly comprehends in an apparatus of the character described, a two stage direct current voltage amplifier circuit which includes a null point visual indicator and means for varying the potential in said circuit so as to fully illuminate the target of the visual indicator, said amplifier circuit being adapted to be thrown in circuit with a high resistance medium permeable to hydrogen-ions and which medium surrounds the solution to be tested for acidity, a balancing temperature resistance for compensating for the temperature of said solution, a buffer potentiometer for eliminating or balancing out juncture potentials in the circuit with said high resistance medium, a balancing potentiometer graduated in pH units and a standard cell adapted to be inserted in circuit with the potential thereof opposed to the potential of the balancing graduated potentiometer so as to adjust the variable resistance of the balancing potentiometer circuit in order to obtain a definite potential drop across the balancing graduated potentiometer.

The invention further embodies an indicator of the said character in the amplifier circuit which functions to visually indicate when the potential of one portion of the series circuit is equal and opposed to the potential of the other portion of the series circuit.

With the foregoing and other objects in view, reference is now made to the following specification and accompanying drawing in which is illustrated a preferred form of the invention, while the appended claims cover variations and modifications thereof which fall within the spirit of the invention.

In the drawing:

Fig. 1 is a diagrammatic view of the apparatus illustrating the glass electrode in perspective with portions thereof in section.

Fig. 2 is a sectional view through the stop cock of the glass electrode taken on the line 2—2 of Fig. 1 and illustrating in full and dotted lines the several positions of one of the passageways of the rotating core thereof.

Fig. 3 is a similar view taken on line 3—3 of Fig. 1 and illustrating in full and dotted lines the positions of the other passageway of the rotating core of the stopcock.

Referring to the drawing by characters of reference, the apparatus includes a glass electrode 11, a balancing calibrated potentiometer 12, a standard cell 13, an uncalibrated buffer potentiometer 14, a temperature resistance 15 calibrated in thermal units and a two stage voltage amplifier circuit 16.

The glass electrode 11 preferably consists of a glass jacket 17 having an upwardly extending offset tubular extension 18 and a glass inner tube or membrane 19 protruding through and sealed to the opposite ends thereof. The upper end of the inner tube or membrane 19 is connected to a funnel 20 while the lower protruding end thereof is connected to a five way stop cock 21 by a rubber ferrule 22. A tube 23 is affixed to the casing of the stop cock 21 in communication with one of the ports thereof and through said port is adapted to communicate with a passageway 24 in the rotating core 25 thereof. The tube 23 has mounted thereon an enlarged bulb 26 providing a liquid reservoir with a filling opening 27 in the top thereof.

The rotating core 25 of the stop cock is also provided with a second passageway 28 therethrough which is adapted to be placed in communication through a port in the casing of the stop cock with one leg 29 of a bifurcated conduit 30 connected to and communicating with an upwardly extending vessel 31 with the open end of the conduit 30 extending into and terminating adjacent the upper end thereof. The other end of the passageway 28 is adapted to communicate through a port in the casing of the stop cock with a discharge tube 32. The other end of the passageway 24 is adapted to be placed in communication through a port in the casing of the stop cock with the opposite leg 33 of the bifurcated conduit 30. The vessel 31 is provided with a tube 34 connected therewith and extending upwardly from the lower end thereof, the juncture of the said tube with the vessel 31 being sealed to prevent flow of liquid therebetween. A platinum wire 35 is embedded in the sealed connection between the said tube and vessel 31 with the opposite ends of the wire 35 projecting respectively into the said tube and vessel.

The tube 34 is filled to a point adjacent the upper end thereof with mercury indicated by the reference character 36 and in which the projecting end of the platinum wire 35 is immersed. The mercury 36 constitutes one of the terminals of the glass electrode 11 and extending into the upper open end of the tube 34 and immersed therein is a conductor 37 leading from the glass electrode. The vessel 31 is also provided with mercury indicated by the reference character 38 sufficient in quantity to cover and immerse the opposite end of the platinum wire 35 and superimposed upon the mercury therein is a paste indicated by the reference character 39, composed of mercurous chloride mixed with mercury and potassium chloride crystals.

The tubular extension 18 of the glass jacket 17 has fitted in the open end thereof a glass tube 41 sealed at its lower end and having embedded therein a platinum wire 42 which has its free end projecting downwardly into the tubular extension 18 and its upper end immersed in mercury 43 in the said tube. The mercury 43 forms the opposite terminal of the glass electrode 11 and in which is immersed the end of a conductor 44. The lower protruding end of the platinum wire 42 is silver plated and chloridized.

The conductor 44 is connected at its opposite end to the "on" terminal 45 of a single pole, double throw switch 46, the central terminal 47 of which has connected thereto a conductor 48 constituting one of the conductors leading to the two stage amplifier circuit 16. The opposite or "zero" terminal 49 of the said switch has connected thereto a conductor 50 leading to and connected with one of the middle poles 51 of a double pole, double throw switch 52, the opposite middle pole 53 thereof has connected thereto a conductor 54 which leads to and is connected with the terminal 55 thereof and from which leads a conductor 56 forming the opposite lead to the two stage amplifier circuit 16. The terminal 57 opposite the terminal 55 has a conductor 58 leading to the negative side of the standard cell 13 and from the positive side of which cell a conductor 59 leads to a middle terminal 60 of a triple pole double throw switch 61.

The pole 62 of the switch 52 on the same side thereof as the terminal 57 has a conductor 63 leading therefrom to the circuit of the balancing calibrated potentiometer 12. The remaining terminal 65 of the switch 52 located on the same side as the terminal 55 thereof has a conductor 66 leading to one of the middle poles 67 of a double pole reversing switch 68. The outside middle pole 69 of the switch 61 has connected thereto the conductor 37 of the glass electrode 11. The outside terminals 70, 71 and 72 have conductor wires 73, 74 and 75 leading therefrom respectively to the middle pole 76 of the reversing switch 68, the contact 77 of the calibrated resistance 78 of the potentiometer 12 and the movable contact arm 79 of the buffer potentiometer 14. The central pole 80 of the switch 61 has a conductor 81 leading therefrom and connected to the end contact 82 of the calibrated resistance 78 of the potentiometer 12. The central terminal 83 of the switch 61 has a conductor 84 leading therefrom and connected to the movable contact arm 85 of the temperature resistance 15, the central terminal 83 also being connected to the free terminals 86 of the switch 61 by a conductor 87.

The balancing calibrated potentiometer 12 disposed between the conductors 63 and 81 includes the aforesaid calibrated resistance 78 preferably consisting of fourteen contacts separated by 100 ohm resistance steps and with a conductor 88 connecting the "zero" contact 89 thereof with the terminal 90 of a continuous wire wound resistance 91 of 600 ohms. The said contacts are calibrated and designated by indicia ranging from "zero" to "thirteen" respectively. The continuous wire wound resistance 91 is provided with graduations from "zero" to "one hundred" for providing fractional readings between each of the unit readings of the calibrated resistance 78. The opposite terminal 92 of the resistance 91 is connected by a conductor 93 to a resistance 94 of 18.1 ohms which resistance is connected on its opposite side to the conductor 63. The calibrated resistance 78 and the continuous wire wound resistance 91 are provided with movable contact arms 95 and 96 respectively which arms are connected by conductors 97 and 98 to the terminals 99 and 100 of the reversing switch 68 and from the terminals 99 and 100 to the diagonally opposite terminals respectively 101 and 102. The continuous wire wound resistance 91 has a conductor 103 shunted across the terminals 90 and 92 thereof and with a resistance 104 of 120 ohms in said shunt circuit in parallel with the 600 ohm resistance thereof.

The balancing calibrated potentiometer 12 also includes a conductor 105 extending from the resistance 94 to the negative side of a 1½ volt battery 106 and from the positive side thereof to a movable arm 107 of a 1000 ohm resistance 108, a conductor 109 connecting the said resistance 108 to the movable arm 85 of the temperature resistance 15. The temperature resistance 15, graduated in thermal units, is of 200 ohms and is connected to the terminal 82 of the calibrated resistance 78 through a 200 ohm resistance 110.

The buffer potentiometer 14 includes a 400 ohm resistance 111 connected on one side by a conductor 112 to the negative side of a 1½ volt cell 113, the positive side of which is connected by a conductor 114 to a 2000 ohm resistance 115, the opposite side of said resistance being connected to the opposite side of the resistance 111 and to the conductor 73 at 116.

The two stage voltage amplifier circuit 16 includes a 6C6 amplifier tube, designated by the reference character 120, and a 6E5 amplifier tube 121. The 6C6 tube is a triple grid tube of the heater cathode type and includes a suppresser grid 122, a control grid 123, a screen grid 124, a plate or anode 125, a cathode 126 and a filament 127 which filament is connected to the terminals of a 6 volt storage battery 128 as at 129 and 130 and with a filament switch 131 interposed in circuit therewith. This tube is constructed to operate on a free grid potential of approximately minus 1½ volt which is obtained by putting the cathode at a potential of approximately plus 1½ volt. The free grid potential of the control grid is obtained with the terminal 47 of the switch 46 positioned in open relation or out of contact with either of the terminals 45 and 49 thereof, the grid being free the tube will assume a free potential between the control grid 123 and the cathode 126 of 1½ volts.

The 6E5 tube, designated by the reference character 121, includes a control grid 133, a plate or anode 134, a cathode 135, a filament 136, the terminals of which are likewise in circuit with the opposite sides of the 6 volt battery 128 and connected to the terminals 129 and 130 and having the filament switch 131 interposed in circuit therewith. The 6E5 tube is a high vacuum heater cathode type tube which indicates visually by means of a fluorescent electron target 137 the effects of a change in the controlling voltage applied to the control grid 133. The flow of electrons from the cathode 135 to the plate or anode 134 is by means of the conductor 138 which is connected to the negative side 139 of a 90 volt battery 140 and from the positive side 141 of said battery through the conductor 142 to a fixed resistance 143 of 500,000 ohms to the anode terminal of the tube. The flow of current is to be considered as emanating from the positive terminal 141 of the battery 40 through the conductor 142 thence through the 500,000 ohm resistance 143, thence plate or anode 134, thence across the gap in the vacuum tube to the cathode 135 which is directly connected to the conductor 138 which leads to the negative side 139 of the said battery. However, it is to be understood that the flow of electrons is in the opposite direction.

The control grid 133 of the 6E5 tube designated by the reference character 121 is connected to the negative terminal of a 22½ volt dry battery 144 by means of a conductor 145, the positive terminal of said battery being connected by a conductor 146 to a juncture point 147. The plate 125 of the 6C6 tube, designated generally by the reference character 120 is also connected to the juncture point 147 by a conductor 148. The plate 125 having approximately a voltage of plus 19.2 volts will produce a voltage at the juncture 147 of the same amount. The plate 125 of the 6C6 tube has a voltage of 19.2 volts for the reason that the same is connected by means of the conductor 148 and a conductor 149 to one end of a 5 million ohm resistance 150, the opposite end of which resistance is connected by a conductor 151 to the 45 volt terminal 152 of the 90 volt battery. The negative terminal 139 of said 90 volt battery 140 is connected to the ground as at 153. The current flowing in the said circuit being 5.16 micro-amperes and the potential drop across the 5 million ohm resistance 150 being 25.8 volts, the voltage at the juncture 147 is plus 19.2 volts.

The suppresser grid 122 of the 6C6 tube is connected by the conductor 155 to the cathode 126. This arrangement places the suppresser grid under the same potential as the cathode. The screen grid 124 is connected by a conductor 156 to an adjustable terminal 157 of a 20,000 ohm resistance 158 and which resistance on one side is connected to the negative terminal 139, through a 20,000 ohm resistance 159, of the 90 volt battery 140 and on the opposite side to the 22½ volt terminal 160 thereof with a 10,000 ohm resistance 161 and switch 162 between the 22½ volt terminal thereof and the resistance 158. By this arrangement potential variance between 9 and 18 volts may be applied to the screen grid 124 by moving the adjustable terminal 157 on the resistance 158. This is done to adjust the illumination on the electron target 137 with the control grid 123 free as hereinbefore described. With the control grid 133 at approximately minus 3.3 volts, the electron target 137 is completely illuminated and in the operation of the apparatus the terminal 157 is adjusted on the resistance 158 so as to maintain the control grid 133 at approximately minus 3.3 volts so as to effect the proper illumination of the electron target 137 with the said control grid 123 free as hereinbefore described.

The cathode 126 is connected to an adjustable terminal 163 of a 6000 ohm resistance 164, the opposite ends of which resistance are connected respectively to the 6 volt battery 128 through a 15,000 ohm resistance 165 on the one side and 50,000 ohm resistance 166 on the other side and with the switch 131 interposed between the resistance 166 and the positive side of the battery 128. The negative side of the 6 volt battery 128 is connected to the ground as at 153 as is also the conductor 56 from the terminal 55 of the switch 52. The opposite conductor 48 of the voltage amplifying circuit 16 is connected as hereinbefore described to the free terminal 47 of the switch 46 and with its opposite ends connected to the control grid 123.

When the switch 46 is thrown to connect the free terminal 47 to the "zero" terminal 49 thereof, and the switch 52 thrown to connect the terminals 51 and 55, the control grid 123 of the 6C6 tube is connected to the ground through the conductor 50 and from the terminal 51 of the switch 52 to the terminal 55 thereof and thence through the conductor 56 to the ground 153. With the control grid 123 thus connected to the ground, the adjustable terminal 163 of the resistance 164 is adjusted until the control grid 133 is brought to a potential of minus 3.3 volts which adjustment places the cathode 126 at plus 1½ volts with reference to the control grid 123. Adjusting the terminal 163 of the resistance 164 in this manner, the electron target 137 is brought to complete illumination and the voltage at the juncture 147 is approximately 19.2 volts.

In using the apparatus for determining the acidity of an unknown solution in terms of pH units, the same is operated in the following manner:

With the switch 46 in open relation, the switches 131 and 162 are closed thus placing the control grid 123 of the 6C6 tube at a free grid potential of approximately 1½ volts. The terminal 157 is then adjusted on the resistance 158 to thereby adjust the voltage applied to the screen grid 124 so as to place the control grid 133 of the 6E5 tube at approximately minus 3.3 volts at which voltage the electron target 137 is completely illuminated. The switch 46 is then thrown to "zero" position and the switch 52 thrown so as to connect the terminals 51 and 55, the conductor 48 is then connected through the switch 46 to the conductor 50 and from the conductor 50 through the switch 52 to the conductor 56, thus closing the amplifier circuit 16 and connecting the control grid 123 to ground at 153. The terminal 163 is then adjusted on the resistance 164 until the control grid 133 is brought to the potential of approximately minus 3.3 volts which adjustment places the cathode 126 of the 6C6 tube at plus 1½ volts with reference to the potential of the control grid 123 and producing a voltage at the juncture 147 of approximately 19.2 volts and completely illuminating the electron target 137.

The switch 61 is then thrown to connect the terminals 60 with 86 and 69 with 72 and the switch 52 thrown to connect the terminal 51 with the terminal 52, the switch 46 being retained in the previously set position connecting the terminal 47 with the terminal 49 thus placing the standard cell in circuit with the potentiometer 12 and with the voltage amplifier circuit 16. This is done to balance the potentiometer 12 against the standard cell 13 which is effected by moving the adjustable terminal 107 of the resistance 108 so as to again bring the electron target 137 to complete illumination. It is to be understood that before moving the adjustable terminal 107 of the resistance 108, the adjustable terminal 85 of the temperature resistance 15 is set to the position which corresponds with the temperature of the glass electrode 11 and the solutions to be employed therein.

With the switch 61 retained in the previously set position, the switch 52 is then thrown to connect the terminals 51 with 55 and 53 with 65. The glass electrode 11 is then supplied with a standard solution or a solution of known acidity and the movable contact arms 95 and 96 set to the known pH of the said standard solution and the switch 46 thrown to the "on" position connecting the terminal 45 with 47. Thus the standard cell 13 is out of circuit and the glass electrode is interposed in circuit through the conductor 44, switch 46 and conductor 48 with the voltage amplifier circuit 16 and through the conductor 56, switch 52 and reversing switch 68 in the direct position to the movable contact arm 96 of the potentiometer 12. The opposite conductor 37 of the glass electrode 11 is connected through the switch 61 to the adjustable terminal 79 of the buffer potentiometer 14 and from the potentiometer 14 through the conductor 73 to the terminal 76 of the double throw switch 68 and thence to the terminal 99 thereof and movable contact arm 95 of the potentiometer 12.

The movable contact arm 79 of the buffer potentiometer 14 is then adjusted on the resistance 111 so as to again bring the electron target 137 to complete illumination. Adjusting the buffer potentiometer 14 in this manner with a solution of known acidity in the glass electrode balances out the juncture potentials in the circuits, so that when the potential across the inner tube or membrane 19 is obtained for an unknown solution by the readings on the calibrated resistances 78 and 91 of the calibrated potentiometer 12, the same will be the true readings of the potential due to the hydrogen-ion concentration in the unknown solution. The standard or known solution is then removed from the glass electrode 11, the electrode supplied with the unknown solution and the movable contact arms 95 and 96 adjusted so that the electron target 137 is fully illuminated whereupon the unit reading on the calibrated resistance 78 and the fractional reading on the resistance 91 will give the acidity of the unknown solution in terms of pH units.

In employing the glass electrode 11 in the apparatus, the glass jacket 17 is filled with a $\frac{1}{10}$ normal solution of hydrochloric acid so that the silver plated and chloridized end of the platinum wire 42 is immersed therein. The rotating core 25 of the stop cock 21 is set so that the inner tube or membrane 19 is connected through the passageway 28 to the discharge tube 32. The inner tube or membrane 19 is then filled through the funnel 20 with the said standard solution, as aforesaid, the passageway 28 being allowed to remain open until some of the solution is discharged through the discharge tube 32 after which the rotating core 25 is rotated in a clockwise direction closing the outlet 32 so that the solution is retained in the inner tube or membrane 19 and the outlet 32 is in communication with the passageway 28 to the leg 29 of the bifurcated conduit 30. This connects the bifurcated conduit 30 through the leg 33 thereof and the passageway 24 in the rotating core to the tube 23 having mounted thereon the enlarged bulb 26. The bulb 26 is supplied through the opening 27 thereof with potassium chloride solution which flows through the passageway 24, the bifurcated conduit 30, passageway 28 and discharge tube 32 and upwardly through the open end of the conduit 30 into the vessel 31 and in contact with the paste 39 in the bottom thereof.

The vessel 31 is filled with the potassium chloride solution to a point above the upper end of the tube 38 after which the rotating core 25 is again rotated in a clockwise direction thus closing the discharge tube 32 and the passageway 24 to the tube 23 and bulb 26 and connecting the leg 29 with the passageway 28 and in communication through the ferrule 22 with the inner tube or membrane 19 so that the potassium chloride solution in the vessel 31, tube 38 and leg 29 is brought into abutting relation in the passageway 24 of the stop cock 21, with the standard solution in the inner tube or membrane 19. In this manner the conductor 37 is in circuit through the mercury 36 in the tube 34, the platinum wire 35, mercury and solutions in the vessel 31 and conduit 30 with the standard solution in the inner tube or membrane 19. The opposite conductor 44 is in circuit through the platinum wire 42 with the hydrochloric acid in the glass jacket 17 and with the inner tube or membrane 19 which completes the circuit with the standard solution contained in the inner tube or membrane 19, the said inner tube or membrane being a high resistance medium permeable to hydrogen-ions in the said solution.

When the buffer potentiometer 14 has been adjusted as hereinbefore described with the glass electrode supplied with a standard solution whose acidity is known, the said solution is then drained from the glass electrode and the unknown or solution whose pH is to be determined is then inserted in the inner tube or membrane 19 and the rotating core 25 of the stop cock 21 adjusted as hereinbefore described to again fill the legs 29 and 33 of the conduit 30 with fresh potassium chloride solution from the bulb 26. This will permit of the potassium chloride solution in the leg 29 flowing into abutting relation in the passageway 24 in the stop-cock 21 with the unknown solution in the inner tube or membrane 19 as hereinbefore described after which the movable contact arms 95 and 96 are adjusted until the electron target 137 is illuminated, the readings on the calibrated resistances 78 and 91 for the setting of the contact arms 95 and 96 indicating the acidity of the unknown solution in terms of pH units and fractions thereof.

The apparatus may also be employed for indicating electromotive force. In the event that a solution is to be tested for electromotive force, the glass electrode is employed as hereinbefore described, while if a metal or other material is to be tested the conductors 37 and 44 are connected to the opposite ends thereof.

In operating the apparatus for the determination of electromotive force, the switch 61 is thrown so as to connect the outside terminal 60 with the outside terminal 71, the outside terminal 69 with the outside terminal 70 and the middle terminal 80 with the middle terminal 83, thus eliminating from the circuit the buffer potentiometer 14 and the temperature resistance 15. The balancing potentiometer 12 is balanced against the standard cell which is effected by throwing the switch 52 to connect the terminal 51 with 57 and 53 with 62. The resistance 108 is then adjusted until the electron target 137 is completely illuminated which indicates that the potential of the balancing potentiometer between the points 77 and 167 is equal and opposed to that of the standard cell. The switch 52 is then thrown to connect the terminal 51 with 55 and 53 with 65 thus disconnecting the standard cell from the circuit and placing the balancing potentiometer 12 in circuit through the conductors 37 and 44 with the material to be tested. The switch 46 is then thrown to connect the terminal 47 with 45 and thereafter the movable contact arms 95 and 96 are adjusted on the resistances 78 and 91 until the electron target is again fully illuminated, the reading on the resistances 78 and 91 giving the electromotive force of the material being tested. For this determination the resistance 78 of the balancing potentiometer 12 is graduated in units of electromotive force and the resistance between adjacent contacts thereof each being of one hundred millivolt steps. If in balancing the potentiometer 12 against the material being tested, it is found that the potential thereof is not opposed to the potential of the said material, the reversing switch 68 is thrown to the opposite position so as to place the potential of the balancing potentiometer 12 opposed to that of the material being tested.

What is claimed is:

1. In an apparatus for indicating potentials, a high resistance medium permeable to hydrogen-ions and adapted to be interposed in contact with a solution to be tested for the potential thereof, a balancing potentiometer for indicating the potential of said solution due to the hydrogen-ion concentration thereof, a direct current voltage amplifier circuit including a visual indicator and means in said circuit for varying the potential thereof to effect the complete illumination of the said indicator, means for connecting said amplifier circuit and said balancing potentiometer in series with said high resistance medium, a buffer potentiometer for compensating for juncture potentials in said series circuit, means for connecting said buffer potentiometer in said series circuit, a variable resistance in circuit with said high resistance medium for compensating for the temperature of the said solution, a standard voltage cell, and means for connecting said cell in circuit with the balancing potentiometer for balancing the potentiometer against the standard cell so as to obtain a definite potential drop across the balancing potentiometer.

2. In an apparatus for indicating potentials, a high resistance medium permeable to hydrogen-ions and adapted to be interposed in contact with a solution to be tested for the potential thereof, a balancing potentiometer for indicating the potential of said solution due to the hydrogen-ion concentration thereof, a direct current voltage amplifier circuit including a visual indicator and means in said circuit for varying the potential thereof to effect the complete illumination of the said indicator, means for connecting said amplifier circuit and said balancing potentiometer in series with said high resistance medium, a buffer potentiometer for compensating for juncture potentials in said series circuit, means for connecting said buffer potentiometer in said series circuit, a standard voltage cell, and means for connecting said cell in circuit with the balancing potentiometer for balancing the potentiometer against the standard cell so as to obtain a definite potential drop across the balancing potentiometer.

3. In an apparatus for indicating potentials, a high resistance medium permeable to hydrogen-ions and adapted to be interposed in contact with a solution to be tested for the potential thereof, a balancing potentiometer for indicating the potential of said solution due to the hydrogen-ion concentration thereof, a direct current voltage amplifier circuit including a visual indicator and means in said circuit for varying the potential thereof to effect the complete illumination of the said indicator, means for connecting said amplifier circuit and said balancing potentiometer in series with said high resistance medium, a buffer potentiometer in said series circuit, a variable resistance in circuit with said high resistance medium for compensating for the temperature of the said solution, a standard voltage cell, and means for connecting said cell in circuit with the balancing potentiometer for balancing the potentiometer against the standard cell so as to obtain a definite potential drop across the balancing potentiometer.

4. In an apparatus for indicating potentials, a high resistance medium permeable to hydrogen-ions and adapted to be interposed in contact with a solution to be tested, a balancing potentiometer including a variable resistance, said resistance being graduated in pH units for indicating the potential of said solution due to the hydrogen-ion concentration therein in terms of acidity of said solution, a direct current voltage amplifier circuit including a visual indicator and means in said circuit for varying the potential thereof to effect the complete illumination of the said indicator, means for connecting said amplifier circuit and said balancing potentiometer in series with said high resistance medium, a buffer potentiometer, means for connecting said buffer potentiometer in said series circuit, said buffer potentiometer including a variable resistance adapted to be adjusted for balancing out the juncture potentials in said series circuit and to effect the complete illumination of said indicator when the juncture potentials in said circuit are balanced out, and said graduated variable resistance being adapted to be adjusted to balance the same against the said high resistance medium and when in balance therewith to effect the complete illumination of said indicator.

SAUL B. YOUNG.